US006683854B1

(12) United States Patent
Blanc et al.

(10) Patent No.: US 6,683,854 B1
(45) Date of Patent: Jan. 27, 2004

(54) SYSTEM FOR CHECKING DATA INTEGRITY IN A HIGH SPEED PACKET SWITCHING NETWORK NODE

(75) Inventors: Alain Blanc, Vence (FR); Patrick Jeanniot, La Gaude (FR); Alain Pinzaglia, St Laurent du Var (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/271,953

(22) Filed: Mar. 18, 1999

(30) Foreign Application Priority Data

Mar. 20, 1998 (EP) ............................................. 98480016

(51) Int. Cl.[7] ................................................. H04L 1/00
(52) U.S. Cl. ....................................... 370/241; 714/821
(58) Field of Search ................................. 370/241–245, 370/252, 389, 392, 390, 395.1, 395.7, 395.71, 412, 432; 714/821, 822

(56) References Cited

U.S. PATENT DOCUMENTS

| 5,033,047 A | * | 7/1991 | Uehara | 714/821 |
| 5,301,192 A | * | 4/1994 | Henrion | 370/412 |
| 5,325,364 A | * | 6/1994 | Ouchi et al. | 714/822 |
| 5,535,202 A | * | 7/1996 | Kondoh | 370/395.7 |
| 5,592,486 A | * | 1/1997 | Lo et al. | 370/389 |
| 5,631,906 A | * | 5/1997 | Liu | 370/455 |
| 5,724,351 A | * | 3/1998 | Chao et al. | 370/389 |
| 6,005,865 A | * | 12/1999 | Lewis et al. | 370/398 |

* cited by examiner

Primary Examiner—Min Jung
Assistant Examiner—Andy Lee
(74) Attorney, Agent, or Firm—Carlos Munoz-Bustamante; George E. Grosser (57) ABSTRACT

A system for checking the integrity of data transfer in a switching element in a high speed packet switching network node where multicasting is performed by simultaneously shifting data from a first shift register into the targeted device shift registers. The outputs of the device registers are fed back into the first shift register. The checking system includes a device select circuit for selecting the targeted via a set of select lines and a negative OR gate circuit. The select line signals and the first register output are inputs to the OR gate, the output of which is fed back to the first register. A comparator circuit has inputs supplied by the device select lines and the outputs of the device registers. A processor compares the contents of the first register to the outputs from the logic comparator circuit to test whether the data has been properly multicast to the targeted.

5 Claims, 10 Drawing Sheets

SYSTEM FOR CHECKING DATA INTEGRITY IN A HIGH SPEED PACKET SWITCHING NETWORK NODE

FIELD OF THE INVENTION

This invention relates to a system for checking control data integrity in the switching element of a high speed packet switching network node and more particularly to checking control data integrity during hardware-based multicast switching operations.

BACKGROUND

Modem digital networks are made to operate in a multimedia environment and interconnect a very large number of users and applications through fairly complex digital communication facilities.

Figure 1:
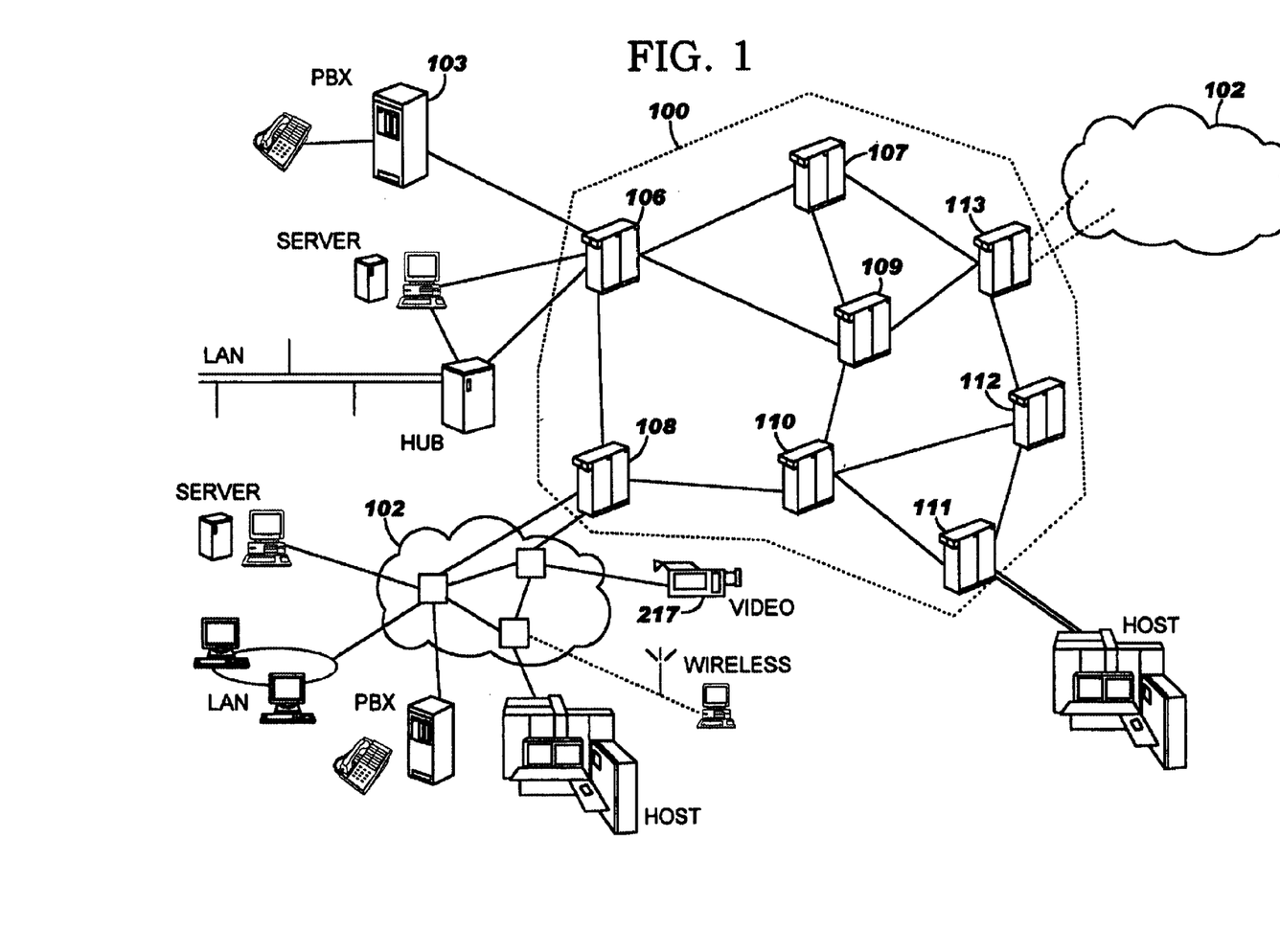
FIG. 1 is a representation of a high speed packet switching network in which the invention can be implemented.

FIG. 1 shows an example of the complexity of present networks. Represented is a backbone network (100), e.g. an Asynchronous Transfer Mode (ATM) network, with multiple end users attached to the network. Some users are directly attached to the ATM network. Others are attached to the ATM network via an access network (102).

As represented in FIG. 1, the system operates in a multimedia environment by transporting pure data as well as video and audio information, the latter possibly being provided by telephone users attached through a private branch exchange (PBX) or central exchange (CX) (103), as well as being provided by base stations (not shown) relaying voice data provided by mobile telephone stations via so-called mobile switch centers (not shown).

Due to the variety of users' profiles and distributed applications, network traffic is becoming more and more bandwidth-consuming, non-deterministic and requiring more connectivity.

This has been the driver for the emergence of fast packet switching network architectures in which data, voice and video information are digitally encoded and then segmented into fixed (in ATM mode of operation) or variable length (in so-called packet transfer mode or PTM mode of operation) packets. In ATM networks, the fixed length packets are normally referred to as "cells" with each cell including 48 data bytes plus a 5-bytes long header, as defined by the CCITT standardization Group/ITU. The packets are then transmitted through a common set of nodes (106, 107, . . . , 113) and links or trunks, interconnecting the nodes to constitute the network communication facilities as represented in FIG. 1.

In ATM networks, regardless of the format of original packets, each packet is converted into fixed length cells for switching operations within each network node.

The need for efficient transport of mixed traffic streams in networks implementing these new architectures imposes a set of performance and resource requirements including very high throughput, short packet processing time, flexibility to support a wide range of connectivity options and efficient flow and congestion control. Congestion is a network state in which the network performance degrades due to saturation of network resources such as communication links bandwidth, and more particularly processor cycles or memory buffers located within the nodes.

One of the key requirements for high speed packet switching networks is to reduce the end to end delay in order to satisfy real time delivery constraints when required and to achieve the necessary high nodal throughput for the transport of voice and video.

Increases in link speeds have not been matched by proportionate increases in the processing speeds of communication nodes and this may induce a serious limitation on network node operating power. The fundamental challenge for high speed networks is to minimize the processing time and to take full advantage of the high speed/low error rate technologies. Most of the transport and control functions provided by the new network architectures are performed on an end to end basis. But the number of operations to be performed per time unit still remains particularly high.

One basic advantage of packet switching techniques (as opposed to so-called circuit switching techniques) is that different types of data can be statistically multiplexed over the same line, which optimizes utilization of the transmission bandwidth. A drawback, however, is that successive packets may require different amounts of time to travel from source to destination. Delays between receipt of successive packets or jitter (variations in packet-to-packet delays) can be detrimental for transmission of isochronous data, like video or voice. This is why methods have been proposed to control networks in such a way that delays and jitters are limited (bound) for every new connection that is set up across a packet switching network.

Different types of data traffic need to be treated differently in order to make sure the data is usable at its destination. Distinctions are made among various types of traffic through assignment of different specific priorities. In other words, when a source terminal requests a connection to a destination terminal via the network, a particular quality of service (QoS) is specified in terms of maximum allowable delay (T_max) and packet loss probability (P_loss) based on the nature of the traffic provided by the source.

As is already known in the art of digital communication, and is disclosed in several U.S. Patents (U.S. Pat. Nos. 6,118,791, 6,055,235 and 6,324,164), a network node can include input and output adapters interconnected by a so-called node switch. Each adapter includes series of buffers or shift registers where transiting packets are temporarily stored. An important requirement for any network node is that it should be able to switch and and transmit data at basically the same rate at which the data arrives. For a 1 Gigabit per second (1 Gpbs) link, that means the node must receive, switch and transmit a cell every 0.43 microsecond.

Also to be taken into consideration is the fact that the data flow is along paths called "Virtual Channels" (VC) and "Virtual Paths" (a VP representing a group of VCs) carried within the physical links or lines. Each virtual path or virtual channel is set up as a series of pointers through the network. A cell header contains identifiers such as "Virtual Path Identifiers" (VPI) and "Virtual Channel Identifiers" (VCI), identifying the connection assigned to the cell, enabling the network switch element to route the cell toward its final destination. Cells on a particular Virtual Channel always follow the same path through the network and are delivered to the destination in the order in which they are received. Once a connection is set up, a Virtual Channel Connection is defined from source user to destination user.

Along with the emerging types of data communication traffic (e.g., multimedia, video distribution/conferencing), there is a need for a system to be capable of handling so-called multipoint connections; that is, a need to be able to send the same cell to different end-users. Cells directed to multiple end-users are called "multicast" or "broadcast" cells. A significant difference between multicasting and broadcasting is defined later in this description. Generally, the source transmitting a multicast cell does not possess necessary information relating to the multiple destinations for said cell and the multicast function must be provided through the network nodes. It is then mandatory for the switch nodes to be able to perform such multicast function. A significant fact is that cell multicast operations require the use of correlative control data which must be simultaneously sent to sets of devices where the set membership may change from one time to the next. The need for simultaneous distribution imposes timing challenges. This requirement is taken into account in various switch implementations. A typical implementation is the so-called shared buffer approach.

While integrity checking of multicasted data is clearly desirable, such checking should not interfere with normal operation of the network node and more particularly should not affect node performance.

SUMMARY OF THE INVENTION

The present invention is a system for checking data transfer integrity in a switching element of the type in which multicasting is performed by simultaneously switching data from a first register to registers in a set of device registers. The set of device registers includes all possible multicast destinations in the switching element. For a particular multicast operation, certain registers in the set are selected via a set of select lines from a select circuit in the switching element. The outputs from the device registers are connected to a logic OR gate circuit, the output of which is connected to an input to the first register. The system further includes a compare circuit which receives outputs from the individual device registers and from the select lines from the select circuit. Data transfer integrity is performed using the outputs from the compare circuit.

Features and advantages of this invention will be apparent from the following detailed description of a preferred embodiment of the invention as illustrated in the accompanying drawings.

DETAILED DESCRIPTION OF A PREFERRED EMBODIMENT

Figure 2:
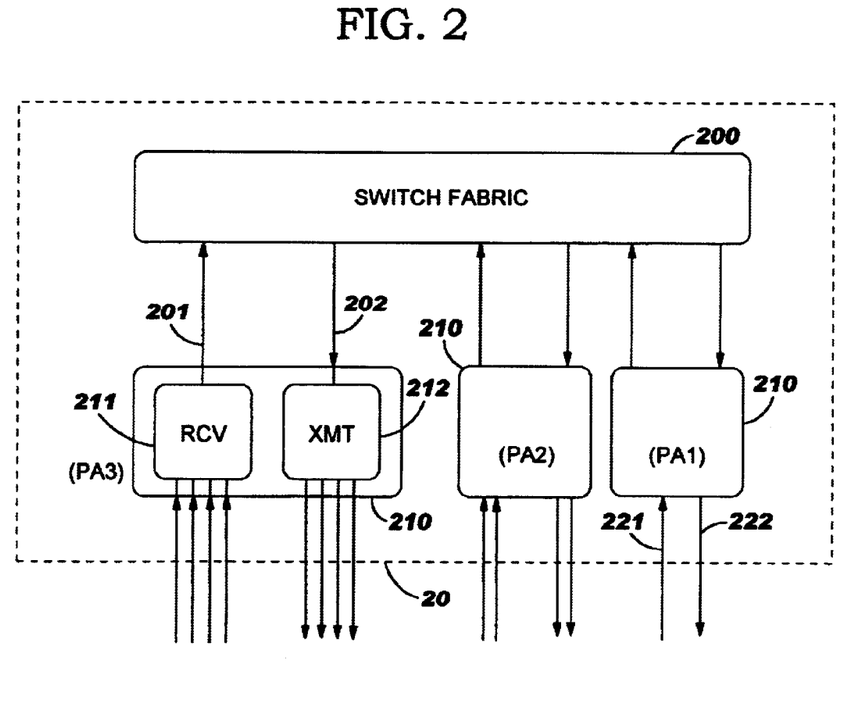
FIG. 2 is a schematic representation of a network node.

As shown in FIG. 2, an ATM switch node (20) comprises a switch fabric (200) connected to a plurality of Port (protocol)Adapters (210) each one being connected to the Switch Fabric by a switch port comprising a receive-switch-bus (201) and a transmit-switch-bus (202). A particular embodiment of a Protocol Adapter is described in detail in commonly assigned copending U.S. patent application Ser. No. 09/018,591 (U.S. Pat. No. 6,324,164) entitled "Asynchronous Transfer Mode (ATM) Protocol Adapter for a high speed Cell Switching System" filed on Feb. 4, 1998.

Each protocol Adapter (210) may support a variable number of ATM communication lines (221, 222) on which ATM cells are received from or transmitted to an end-user (i.e. a terminal or another switching node not represented). The transmission lines (also called inbound links for receiving lines or outbound links for transmitting lines) may have identical or different transmission speeds.

In FIG. 2, three Protocol Adapters are shown connected to the Switch Fabric. The first Protocol Adapter (PA1) supports one input line (221) and one output line (222). The second Protocol Adapter (PA2) supports two input lines (221) and two output lines (222), while the third Protocol Adapter (PA3) supports four input lines (221) and four output lines (222). Assuming the switch device has a thruput of 800 Mbps, Protocol Adapter 1 could for example be connected to a transmission line running at 622 Mbps (such as defined in the ITU-T STM4 data rate), while Protocol Adapter 3 could present four transmission lines running at 155 Mbps (such as defined in the ITU-T STM1 data rate). Protocol Adapter 2 could present one transmission line running at 155 Mbps while the other could be at a lower speed such as 34 or 45 Mbps (such as defined in the ITU-T E3 or T3 data rate).

The number of Protocol Adapters, the number of transmission lines supported by each of those Adapters and the speed of those transmission lines are offered as examples only. The present invention would be useful in the illustrated environment and in many other environments as well.

Each Protocol Adapter (210) comprises a receive (RCV) block circuit (211) which handles ATM cells appearing on input lines (221). In a preferred embodiment, the receive block is based on a pipeline structure that successively performs elementary operations in order to convert an arriving cell into a switch cell on bus (201) that will be handled by the Switch Fabric (200). Each Protocol Adapter (210) also comprises a transmit (XMT) block circuit (212) which handles cells coming from the Switch Fabric (200) on bus (202) and adapts them before outputting them on communication lines (222).

A detailed description of a complete implementation of the Switch Fabric (200) can be found in patent application assigned to the same assignee as the present application. These patent applications include The above mentioned "Asynchronous Transfer Mode ATM Protocol Adapter for a High Speed Cell Switching System" (U.S. Pat. No. 6,324,164 and also U.S. Pat. No. 6,118,791.

Figure 3:
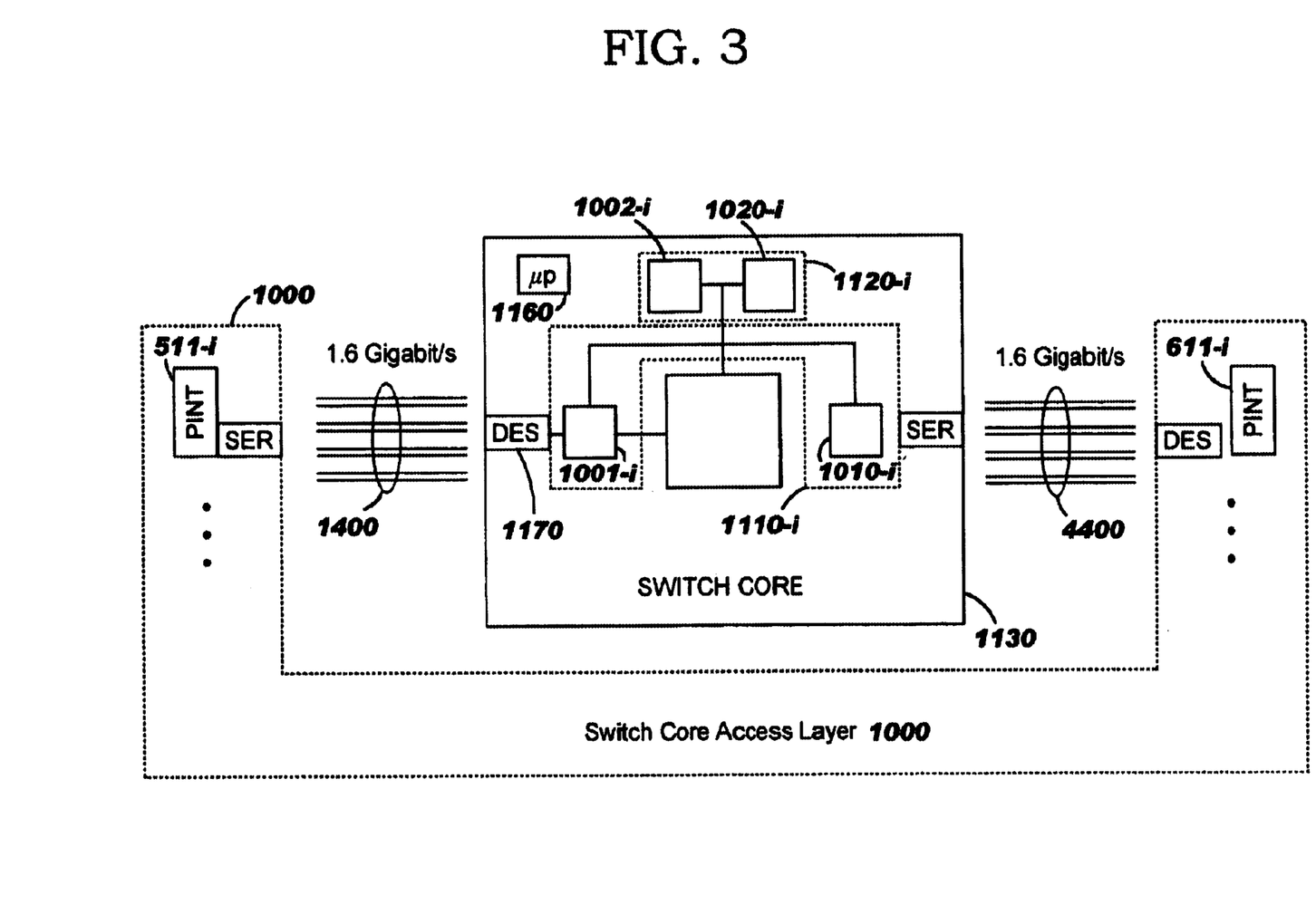
FIG. 3 is a schematic representation of the network node switching device.

The complexity of the Switch Fabric is more readily apparent when considering an implementation including the aggregation of several switching modules to provide speed improvements needed to meet defined network node requirements and more particularly when adding a so-called distributed switch fabric embodiment characteristic as represented in FIG. 3.

Basically, the switch fabric may include one or more Switch Core Access Layer (SCAL) (1000) which might be located in different physical locations and might include individual receive and transmit circuits referenced (511-*i*) and (611-*i*). These are respectively connected to the Switch Core 1130 by 1.6 Gigabits links, via serializing (SER) and deserializing (DES) subsystems.

The switch core (1130) includes a switch structure (450) generally embodied into a card comprising at least four switching elementary modules or electronic chips. Routing control devices (1001-*i*) and (1010-*i*) provide interfacing of the 1.6 Gigabits entry into and exit from the switch core via DES/SER respectively. These routing control devices (1001-*i*) and (1010-*i*), are associated to the same port i and embodied into the same physical chip (1110-*i*) and are also associated to a corresponding storage (1120-*i*) containing two routing control tables (1002-*i*) and (1020-*i*).

It should be noted that the Switch Core (1130) contains a processor (1160) which may access, for control purposes, any storage and register.

Conversely, the system is also provided with an insertion system which allows any cell into the memory to be propagated toward any one of the output ports.

The Switch Fabric system includes systems for reading information from and writing information into target devices. The invention focuses on multicast read and write operations on multiple target devices with the same characteristics. For the purpose of the present invention, multicast operations are meant to deal with control data, i.e. identical data simultaneously directed to several target devices. The system should preserve switch performance levels in a complex Switch Fabric, in which a single processor controls different target devices including: switching module (e.g.450) which module (450) might include four switching devices, routing devices (e.g. 1110-*i*), and transmission devices, as disclosed above with reference to FIG. 3. The same operations are performed on devices belonging to the same category. These operations include initialization of internal registers and tables with writing and reading back for checking purposes; background mode monitoring of internal registers and tables, including integrity checking with serious time constraints; hardware detected error monitoring and, operational modifications such as multicast table update.

Figure 4:
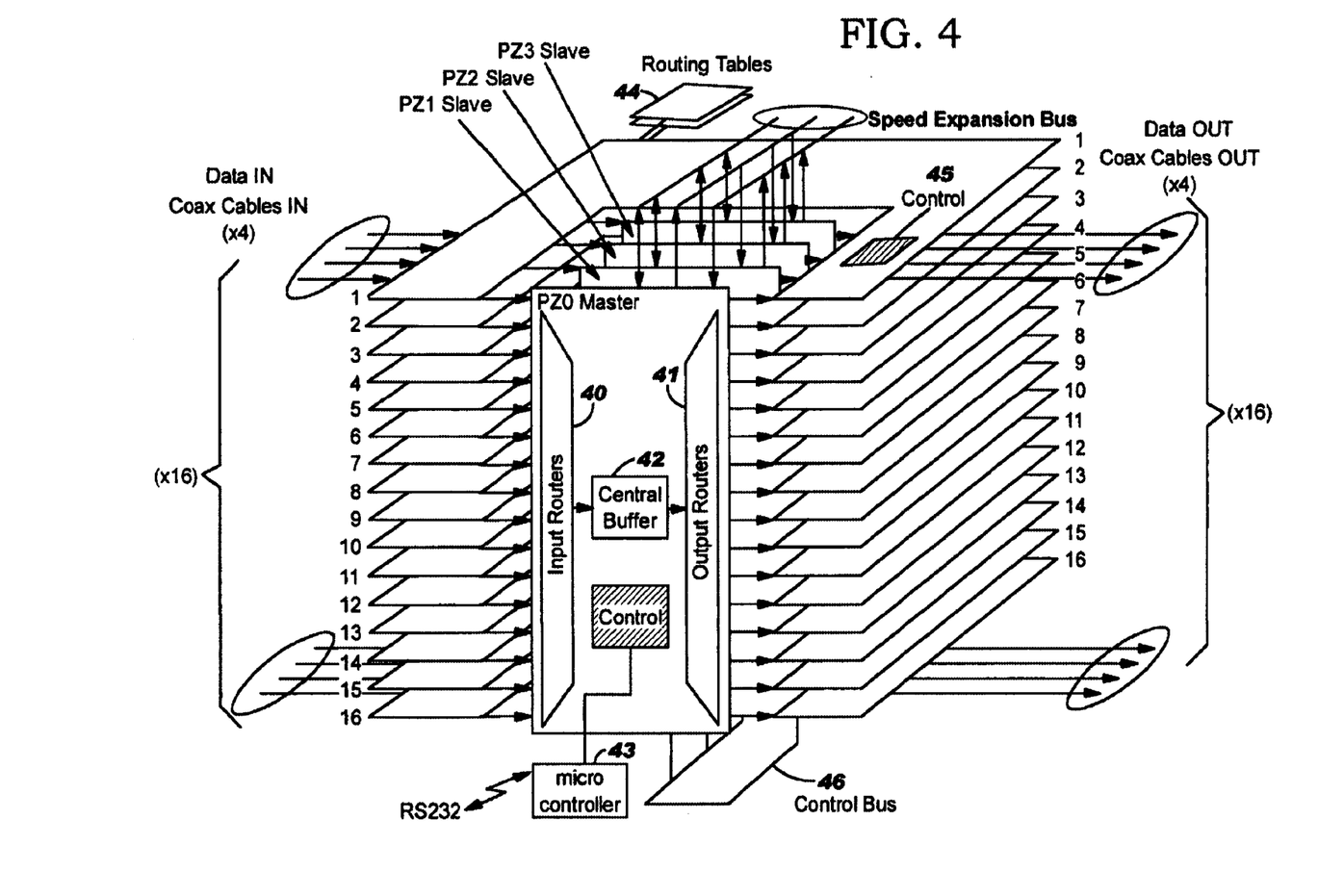
FIG. 4 is another representation of the node switching device emphasizing the representation of control data operation.

To illustrate more particularly the present invention operation, the switching node of FIG. 3 is represented in a different fashion in FIG. 4. The switch, as represented herein, includes sixteen control devices (ODS) represented stacked horizontally, and four switching devices (PRZ). These switching devices include a master device (PRZ0) and three slave devices (PRZ1, PRZ2 and PRZ3)represented in vertically stacked planes. Each PRZ device includes input and output routers (respectively labeled 40 and 41) communicating via central buffer means (42). The microcontroller and and routing tables are herein labeled (43) and (44) respectively. The routing tables (44) are connected to the ODS devices. The microcontroller (43) is connected to the various switching and control devices. Connection of this microprocessor (43) to the control element (45) on the ODS device operates via a control bus (46). The data cells enter the switch at data-in via coaxial cables IN and exit via coaxial cables OUT. Each cell causes retrieval of its routing information in Routing table (44)cut into four parts provided to PZ0, PZ1, PZ2, PZ3 and is routed through these routing devices to the appropriate ODS. The present invention focuses on control data integrity checking during multicast operations.

Figure 5:
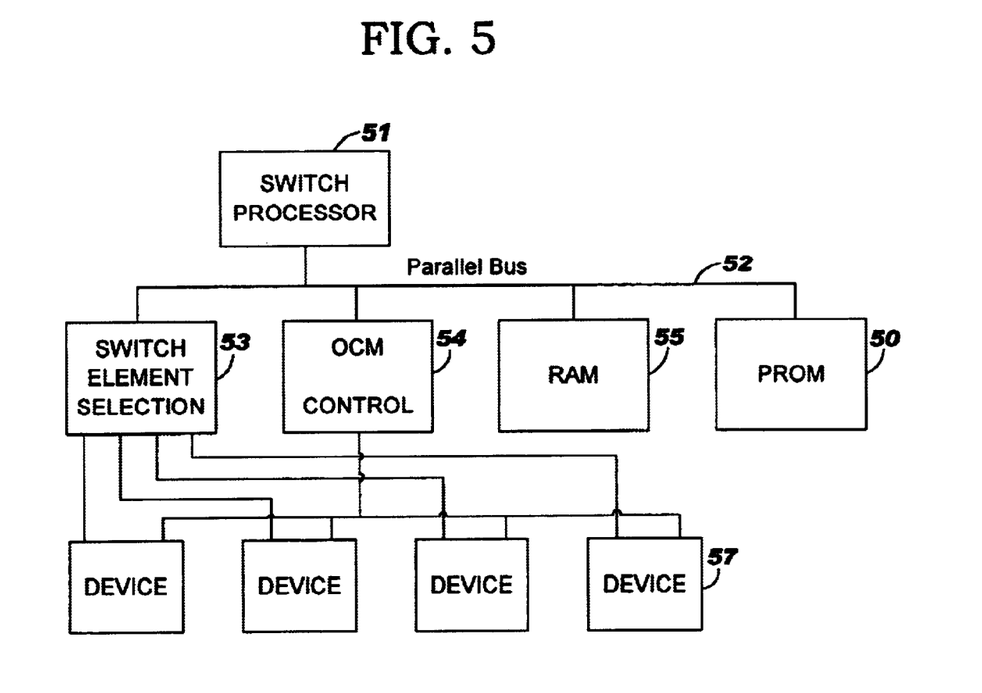
FIG. 5 is a schematic representation of the network node switching device architecture used to perform read/write multicast operations.

The system, schematically represented in FIG. 5, includes a so-called switch processor (51) attached to a parallel bus (52). Also attached to said parallel bus (52) are four devices including a Switch Element Selection device (53), an OCM Transmission Control device (54), a Random Access Memory (55) and a Programmable Read Only Memory (56). The Switch Element Selection (53) and OCM Transmission Control (54) are used for interfacing control data transfers between the processor and various devices (57) as mentioned above with reference to FIG. 4.

According to the operation to be performed, one, several or all the may be selected. When the number of increases, the operations require a large amount of processor bus bandwidth and could limit, in case of multicast operations, the number of routing control table updatings per second and the error detection speed. This last item is critical for the switch-over operation triggering performances.

The interface between the processor and the different is based on a conventional parallel/serial conversion scheme called On Chip Monitoring (OCM). Basically the Switch Element Selection device (53) selects the particular (57) to be read-out or written-in, and the OCM Control Item (54) performs the operation. The write operations are performed simultaneously on all the selected (57). In case of multicast operation all selected are written with the same data. But since these may not be located in the same area, a check must be performed on written data integrity, given the above mentioned time constraints.

To fully understand the error detection provided by this invention, one must first understand the On Chip Monitoring mechanism as applied herein for control data multicast operation. This mechanism, schematically represented in FIG. 6, may be considered as including serial/parallel conversion. The mechanism basically includes a shift register (61) within the OCM control element and connected to the Switch Processor (62) via the parallel bus (63). The device section also includes a shift register (64). The serial data output of OCM shift register (61) is connected to all shift registers (not shown except (64)) via a so-called data input (DI) connection through the /OCM control interface. The serial output of shift register(s) (64) provide output data over (D.O) connection to the serial input of shift register (61) via the above mentioned interface. Also provided to this system are select and clock information for selecting the concerned and for timing the shifting operations respectively.

Figure 6:
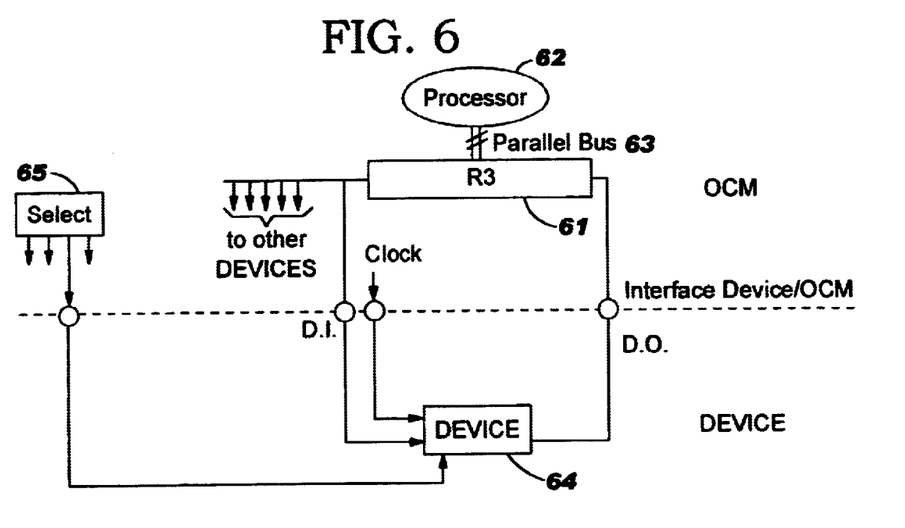
FIG. 6 is a schematic representation of On Chip Monitor (OCM) control of data transfer within the network node switching device.

Basically, the serial data transfers between registers (61) and (64) operate as a shifting permutation from register (61) to register (64) and vice-versa, one pushing the other as long as the considered has been selected as indicated by switch element selection (65).

Figure 7:
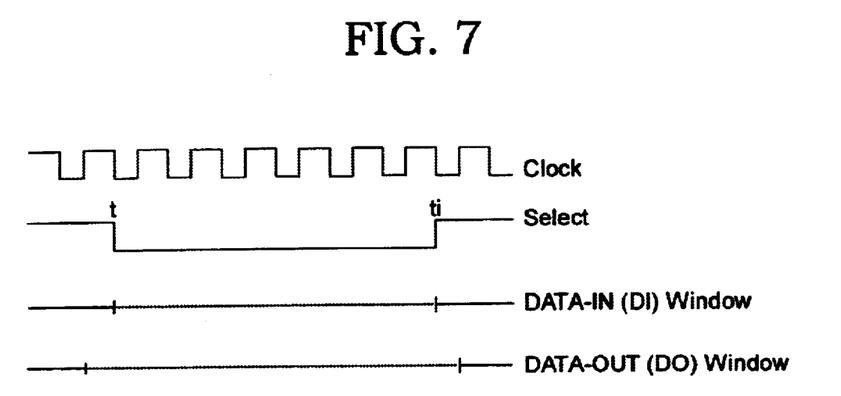
FIG. 7 is a time diagram for showing an example of operation of the system of FIG. 6.

FIG. 7 depicts timing signals for controlling the registers (61,64) data transfers. The clock signal is permanently applied to registers (64) via the interface. But data transfers occur only between t and t', during which time interval the selection window is open for the selected (S). The data are then pushed from register (61) to register (64) during a data-in window (DI) corresponding roughly to the selection window; and data are turned back into register (61) during a slightly delayed data-out (DO) window. Accordingly, a write operation including a transfer of data into one or several is performed simultaneously into all selected as is the case for the so-called multicast operation. Simultaneously the selected (S) contents are all pushed back into register 61.

Assuming no error occurs in writing into all selected, then such a transfer system is rather powerful and convenient. Unfortunately it does not support detection of any error occurring during the multicasting operation. Accordingly, the system must be provided with a convenient error detection mechanism fast enough to meet the Switch timing requirements while interfering as little as possible with the OCM type multicast operation.

Figure 8:
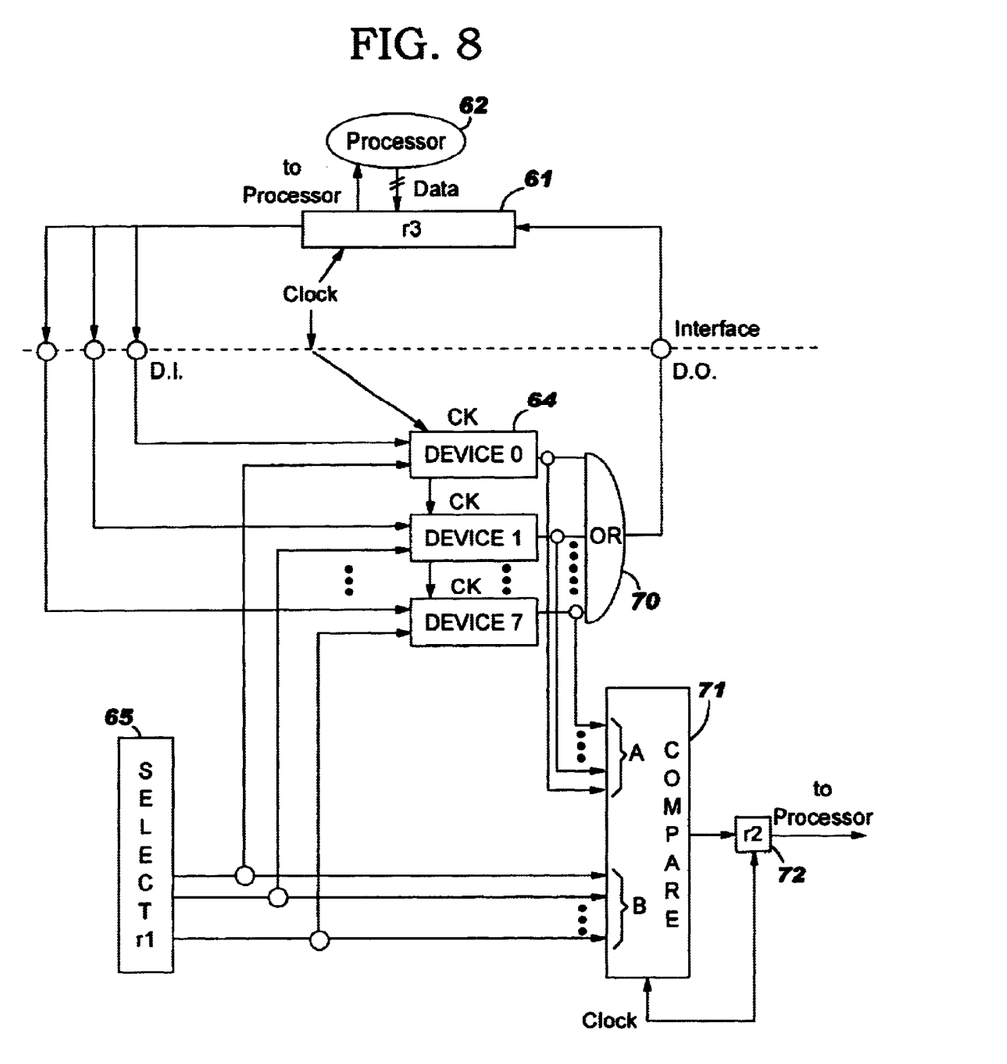
FIG. 8 is a schematic representation of a data integrity checking system constructed in accordance with the present invention.

FIG. 8 is a schematic view of the mechanism provided to enable efficient and fast detection of errors in data written into any register device (64). These goals are achieved by providing adequate means for checking for errors in all register (64) outputs simultaneously while shifting the result back into register r3 (61), no matter whether the register (64) was selected or not, knowing that non-selected registers shall constantly provide a signal at logic level "1".

The proposed circuit as represented in FIG. 8 shows the transfer system as disclosed with reference to FIG. 7 including the microprocessor (62) and the register (61) (r3). Also shown is a representation of multiple register device (64). An OR circuit (70) is connected to receive all register device (64) outputs. This is a negative OR interfacing the Data Out (D.O) to enable detecting wrong zeros since a zero in any entry to the negative OR gate shall force the OR gate output to zero. As the outputs from non-selected register devices (64) should be normally at logic level "1", properly functioning non-selected register devices (64) will not cause the OR output to go to zero. This is because the OR (70) output is "true" or 1 only if all its inputs are at level 1 and is zero if any of its inputs is zero.

A comparator circuit (71) is provided having inputs connected to the respective Data Out (D.O) connections from the individual devices (64). The comparator circuit (71) also has inputs from the respective select lines provided by the Switch Element Selection (65) in register r1. The output of the comparator circuit (71) is fed into a shift register r2 (72), the output of which should show any incorrect logic level "1" within the Data Out (D.0) contents. The processor 62 then reads and compares the outputs from both OR circuit (70) (once fed through shift register r3 (61) and shifted out) and from shift register r2 (72). This enables detecting any wrong digit within the multicast data.

The operation of negative OR circuit (70) and comparator circuit (71) is described below with reference to the time graphic of FIG. 9. Eight registers have been labeled D0, D1, . . . , D7. It is assumed that the multicasted data starts with "0,1,1,0" and then ends up with all "1's", which should appear in all selected registers, while non-selected register devices (64) shall include all "1"s as required. It is assumed that D0, D1, D2 and D3 have not been selected while D4, D5, D6 and D7 are selected for the multicast operation.

Figure 9:
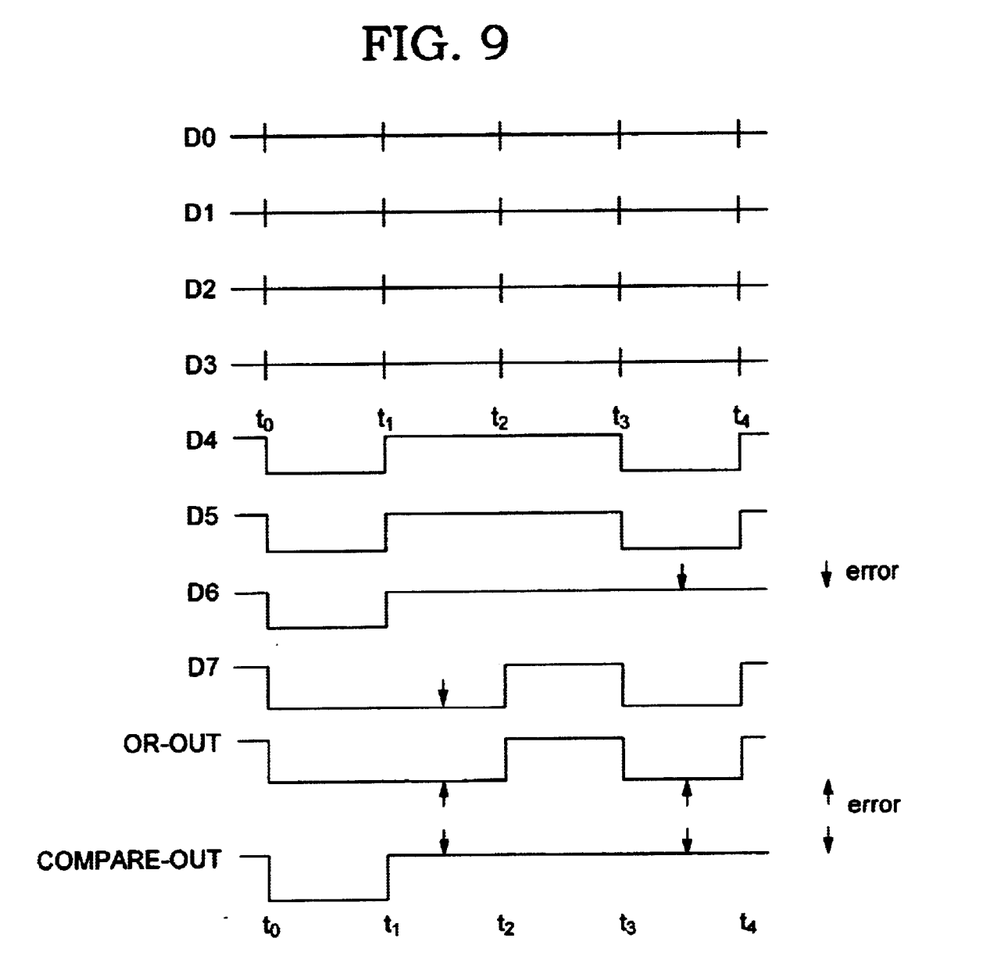
FIG. 9 is a time diagram used to illustrate integrity checking operations.

As represented in FIG. 9, the logic levels in all of the non-selected are high, as they should be, while selected D6 and D7 both show an erroneous digit. D6 includes a wrong "1" (between t3 and t4) and D7 includes a wrong "0" (between t1 and t2). The line labeled "OR out" on the timing graphic representation of FIG. 9 represents the output of the negative OR gate (70). The negative OR gate shows the erroneous "0" between t1 and t2 since the level of D7 is then at negative level (i.e."0"). However, the erroneous "1" on D6 will not appear at the OR gate output between t3 and t4 since at least one of the registers D0 through D7, i.e. registers D4, D5 and D7, is then at a negative logic level.

Accordingly, a processor which looks only at the OR gate (70) output would detect the erroneous "0" but would fail to detect the erroneous "1". Since the non-selected register device (64) outputs remain at logic level "1", these have no affect on the OR gate output information.

Detection of the erroneous "1" is left to a circuit comprising a comparator (71) feeding a shift register r2 (72). The comparator (71) receives both "A" and "B" entries. The "A" entries are the respective data-outs (D.O.) provided by all device (64) outputs. The "B" entries are the selection levels as provided by "select" register r1 (65). In other words, the comparator compares at each clock pulse a D.O word (A) to a select word (B). If a particular device (64) is not selected, the corresponding D.O level and select level are both high and the compare result A=B should be right. On the other hand, as already mentioned, for all selected, the select line is at low logic level as is a zero data level. Thus, A=B again and any wrong zero logic level on D.O. shall not be detected. But for a selected (select line at low logic level) a D.O. at logic "1" shall be at high level. Therefore, in this case, the compare operation indicates A=B as being not true and a logic "1" shall be detected. Then, so does also a "false" "1" when compared to the logic level looked for (as normally expected according to the multicasted value). Then, assuming true A=B is represented by a logic level "0" one shall fully get, for the selected example, the diagram represented on bottom line of FIG. 9 as indicates the state of the COMPARE (71) output line.

Finally, a test performed by the processor on both r2 and r3 outputs shall indicate any error.

To help appreciate this invention, one should keep in mind the requirements already defined in an environment as disclosed in the above mentioned referenced patent applications, particularly, with an expanded switch fabric (see FIGS. 3 and 4 of this invention) including sixteen routing control elements (labeled ODS) (such as 1110-i) and four elementary switching, in the switching (450), herein referenced PRZ.

Figure 10:
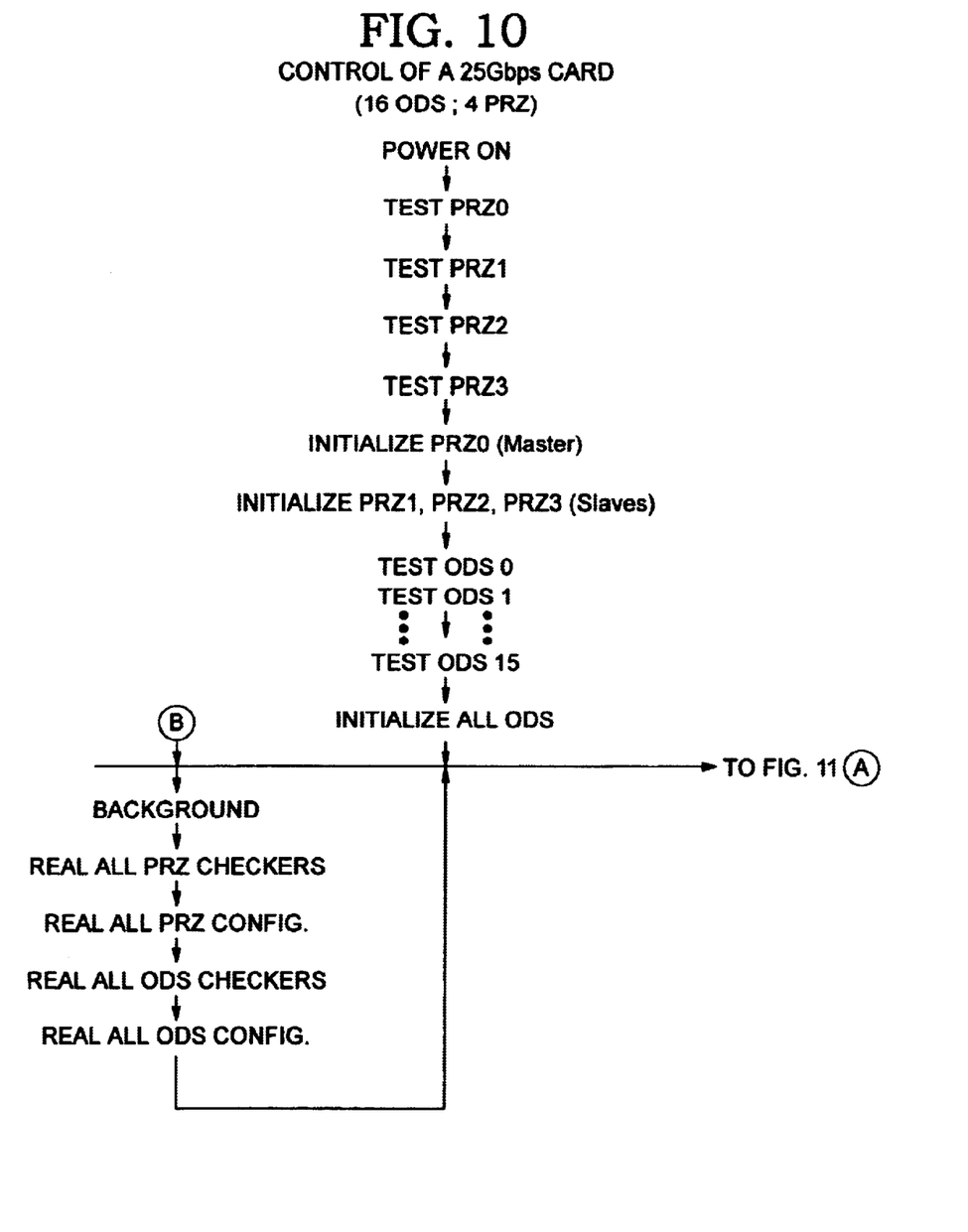
FIGS. 10 and 11 are flow charts illustrating operation of this invention.
Figure 11:
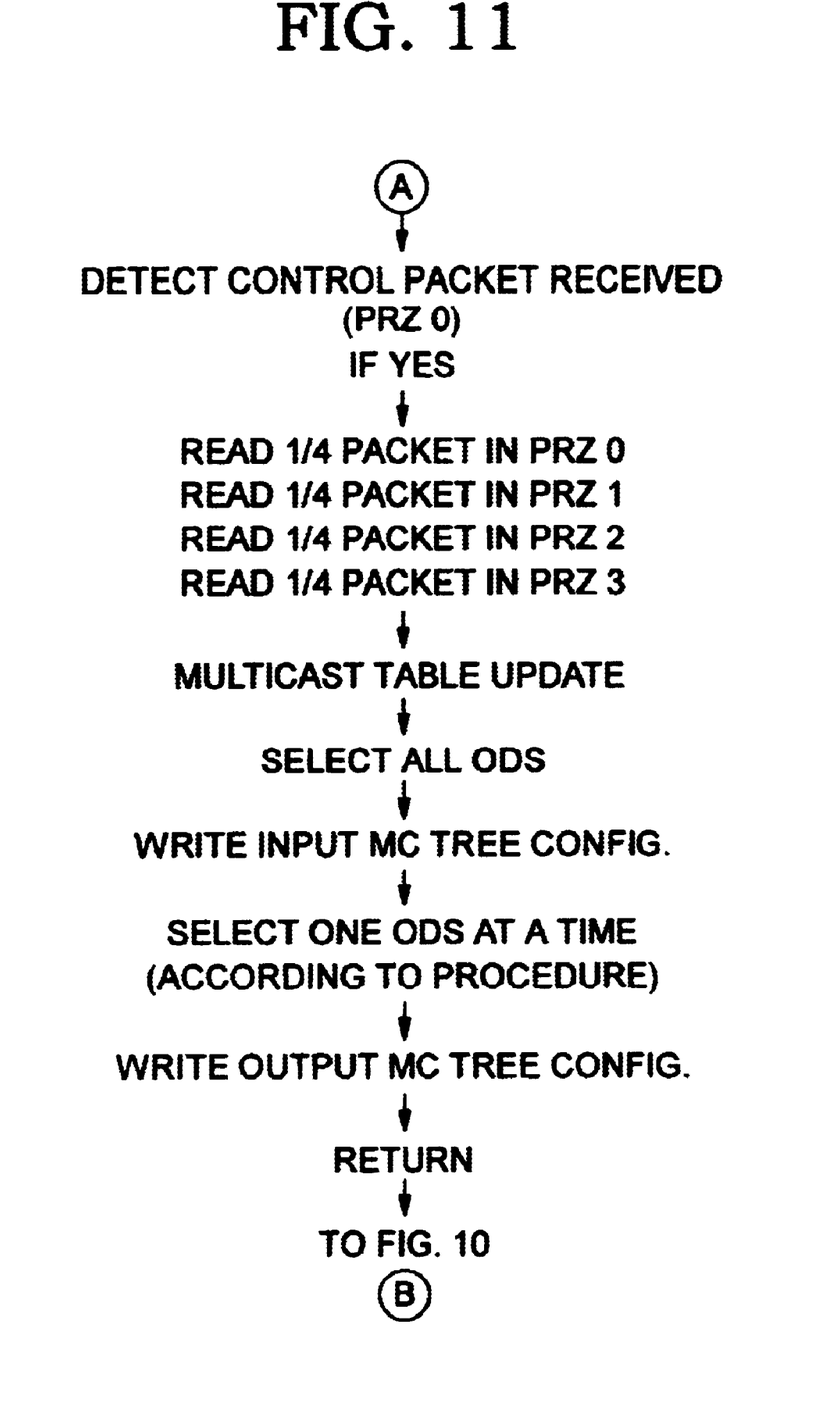

Normal operations of the switch fabric are rather complex as can be seen by reference to the flow chart of FIGS. 10 and 11. This flow chart deal with the control of a 25 Gbps card with sixteen ODS labeled ODS0 through ODS15, and four PRZs labeled PRZ0 to PRZ3, wherein PRZ0 operates as master and PRZ1 through PRZ3 operate as slaves. As shown in FIG. 10, once the power is set ON, all PRZs are first tested. The master PRZ0 is initialized and then the other PRZs are initialized. These operations are followed by sequential tests on ODS0 through ODS15. Assuming these tests are positive, all ODS are initialized. The process branches then either to Background operations or to operations as defined by the flow-chart of FIG. 11.

The background operations include sequentially reading all PRZ checkers and checking all PRZ configurations and then repeating these on ODS. Once these operations are performed the system branches to the flow-chart of FIG. 11.

As disclosed in FIG. 11, the process starts with testing whether a control packet was received in the master PRZ. If this is the case, then the system reads ¼ packet in each PRZ. Packet splitting was performed, as mentioned in the above cited references, to increase the Switch fabric operating rate. Then, in case of multicast operation updating, all ODS are selected and the multicast tree configuration input is written. Then one ODS is selected at a time and the multicast tree configuration output is written. Finally the process returns to starting point.

Knowing that checking, updating or error detection involves looking for values which should be the same in all simultaneously selected, as is the case for control data multicast operations, one may appreciate the impact of the numerous operations on the switch performance, and particularly on its operating rate. Accordingly, a person skilled in the art will appreciate the ability of the present invention, when applied in an actual technical environment, to preserve the Switch Fabric (and therefore also the network switching node) performance.

What is claimed is:

1. A system for checking data transfer integrity in the switching element of a high speed packet switching network node wherein binary data multicast switching operations are performed, said multicast operations involving simultaneously switching the same data from a first register into selected register devices among a set of register devices by simultaneously shifting said data from a first shift register into selected of said register devices through inputs, said shifting operations being performed at a predefined clock rate, said checking system comprising:

- a select circuit arranged to select via a set of select lines, the respective ones of said register devices to which the control data should be multicasted;
- a logic gate circuit, the inputs of which are connected to receive the register outputs;
- a logic COMPARE circuit which compares a first or A set of input signals to a second or B set of input signals to produce an output indicating if the sets match and is connected to receive the outputs from the individual register devices as one set of inputs, and the select lines signals as the other set of inputs;
- a processor for receiving the outputs of the logic gate circuit and the logic COMPARE circuit for performing said data integrity checking based theron.

2. A system as set forth in claim 1 wherein an unselected register device assumes a particular output logic state and said logic gate circuit is of a type to change from its normal output state if any of its inputs are different from the state of an unselected register device.

3. A system as set forth in claim 2 wherein the output of said logic COMPARE circuit indicates an error when any "A" input logic level is different from the corresponding "B" input logic level and indicates no error when each "A" input level is at the same logic level as the corresponding "B" input level.

4. A system as set forth in claim 3 further characterized in that it includes a second shift register fed by the COMPARE circuit output, the first shift register receives the logic gate circuit output and the processor compares outputs from both said second shift register and the first shift register, whereby any false data digit in the multicast data is derived from detecting different logic levels at any given data clocking time within the respective outputs of said shift registers.

5. A system for checking the integrity of multicasting operations in a packet switching element where binary data is switched from a first shift register to one or more registers selected from a set of such registers by means of signals appearing on select lines where the binary signal for not selecting is the same as the output signal of a not selected register, the integrity testing system comprising:

- a negative OR gate having inputs from each of the registers and an output to an input of the first shift register;
- a comparator circuit for comparing the signal carried on each select line to the output signal from the register associated with that select line and changes its binary output to a second shift register if any are different; and
- a processor connected to the first and second shift register for comparing inputs received from said negative OR gate to inputs received from said comparator circuit for differences indicating a signal transfer error.

* * * * *